United States Patent [19]
Taylor

[11] Patent Number: 5,525,029
[45] Date of Patent: Jun. 11, 1996

[54] PALLETIZER HAVING VERTICALLY MOVABLE PALLET SUPPORTS AND AT LEAST ONE GRIPPER ONLY IN A HORIZONTAL PLANE

[75] Inventor: Ellis J. Taylor, West Pennant Hills, Australia

[73] Assignee: McNeall Industrial Technologies PTY Ltd., New South Wales, Australia

[21] Appl. No.: 137,513

[22] Filed: Oct. 18, 1993

[30] Foreign Application Priority Data

Dec. 3, 1992 [AU] Australia .................. PL6177
Mar. 3, 1993 [AU] Australia .................. PL7616

[51] Int. Cl.⁶ .................. B65G 57/03; B65G 57/14; B66C 1/22
[52] U.S. Cl. .................. 414/788.1; 414/791.1; 414/790.9; 414/792.7; 414/751; 294/67.2
[58] Field of Search .................. 414/792.9, 751, 414/752, 792.8, 792.7, 788.1, 789.6, 791.1, 790.2, 790.9; 294/67.2, 67.22

[56] References Cited

U.S. PATENT DOCUMENTS

| | | | |
|---|---|---|---|
| 4,419,035 | 12/1983 | Stobb .................. | 414/791.6 |
| 4,566,836 | 1/1986 | Berger et al. .................. | 414/791.6 |
| 4,787,810 | 11/1988 | Cawley et al. .................. | 294/67.22 X |
| 4,854,815 | 8/1989 | Augst .................. | 414/792.9 X |
| 4,927,318 | 5/1990 | Hayden et al. .................. | 414/791.6 X |
| 4,978,275 | 12/1990 | Reid et al. .................. | 414/791.6 X |
| 5,042,862 | 8/1991 | Tübke .................. | 294/67.22 X |
| 5,169,284 | 12/1992 | Berger et al. .................. | 414/792.9 X |
| 5,203,671 | 4/1993 | Cawley et al. .................. | 414/791.6 |
| 5,263,813 | 11/1993 | Kiederle et al. .................. | 414/792.9 |

FOREIGN PATENT DOCUMENTS

| | | |
|---|---|---|
| 66235/65 | 5/1967 | Australia . |
| 0131555 | 1/1985 | European Pat. Off. . |
| 1260435 | 2/1968 | Germany .................. 414/792.9 |
| 1409000 | 10/1968 | Germany .................. 414/792.9 |
| 2632819 | 1/1978 | Germany . |
| 2721675 | 11/1978 | Germany .................. 414/792.8 |
| 2724978 | 12/1978 | Germany .................. 414/792.9 |
| 2750741 | 5/1979 | Germany . |
| 234654 | 4/1986 | Germany . |
| 3603917 | 8/1987 | Germany .................. 414/791.6 |
| 3806803 | 8/1989 | Germany . |
| 130823 | 8/1983 | Japan .................. 414/792.9 |
| 62-12522 | 1/1987 | Japan .................. 414/792.9 |
| 2-193817 | 7/1990 | Japan .................. 414/792.9 |
| 2141397 | 12/1984 | United Kingdom . |

OTHER PUBLICATIONS

Costi, Sistemi Flessibili Per La Movimentazione (brocure).
Der-Robot-Palletierer, Kettner präsentiert die Palettier-Anlage für Weich-Trays (brochure).

*Primary Examiner*—Andres Kashnikow
*Assistant Examiner*—Lesley D. Morris
*Attorney, Agent, or Firm*—Pollock, Vande Sande & Priddy

[57] ABSTRACT

A palletizing system for placing articles from a conveyor onto two pallets. The palletizing system includes first and second substantially horizontally extending tracks each having a longitudinal axis. The first track adapted to move along the second track. At least two grippers engage at least one article to be palletized. A translatable carriage supports the grippers. The translatable carriage is movably mounted on the first track. Two pallet supports each support a respective pallet. Each of the pallet supports move along a vertical axis. A control controls the movement of the first track, the translatable carriage, the at least two grippers and the two pallet supports. The control is responsive to a predetermined instruction set such that after each of the grippers places at least one article in a layer on a respective one of the pallets, each of the pallets moves downwardly to permit each of the grippers to place at least one more article in a next layer on the respective pallet with minimal or no vertical movement of the grippers.

23 Claims, 8 Drawing Sheets

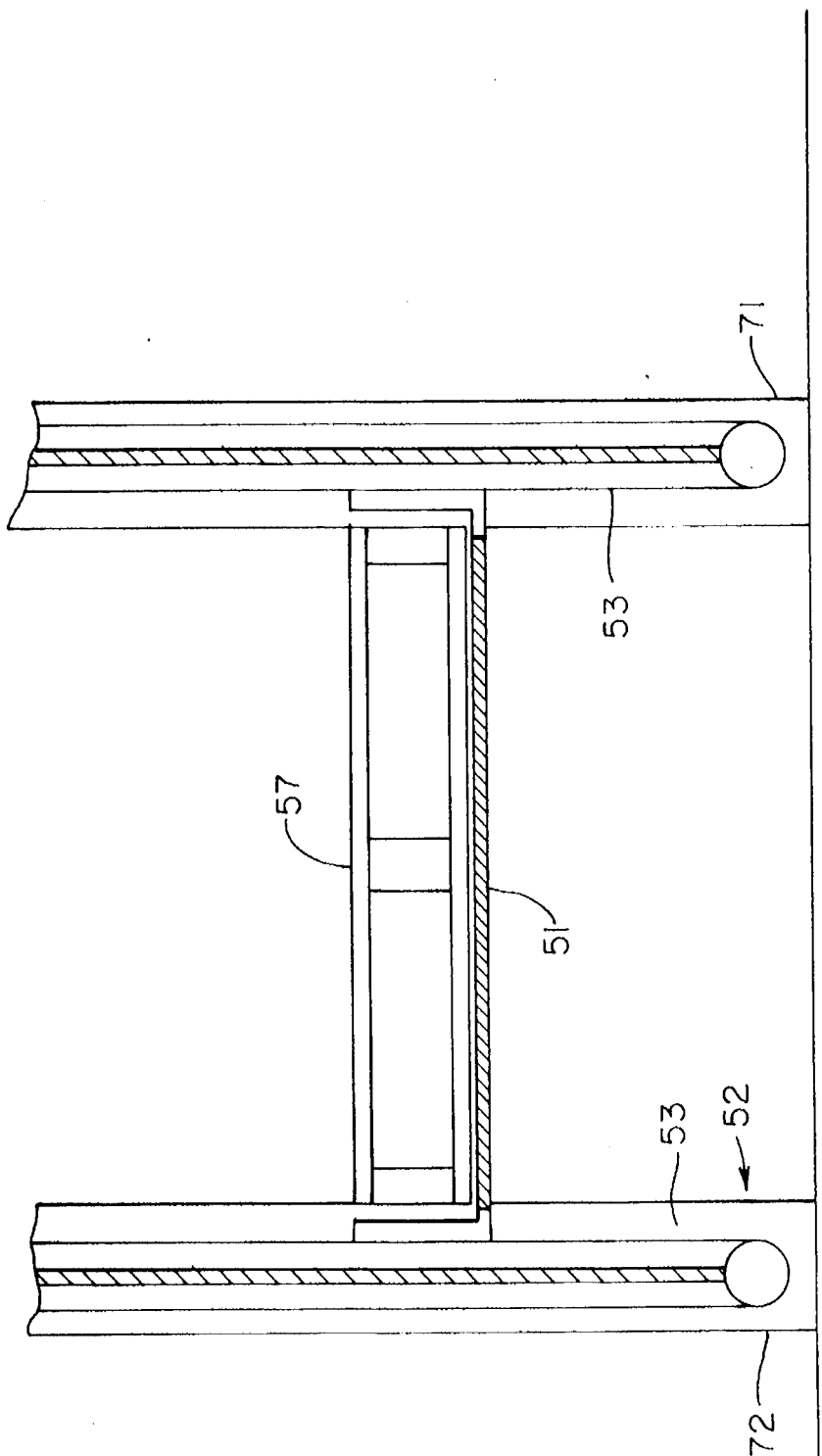

PALLETIZER HAVING VERTICALLY MOVABLE PALLET SUPPORTS AND AT LEAST ONE GRIPPER ONLY IN A HORIZONTAL PLANE

FIELD OF THE INVENTION

The present invention relates to palletizers which are used to collect and load articles and goods onto pallets.

BACKGROUND OF THE INVENTION

Various forms of machinery have been used to perform the task of unloading boxes and goods from a conveyor, and stacking them onto a pallet for subsequent transport or storage.

Robot palletizers utilize a stationary pallet table and a robotic arm which is capable of rotating and moving in the vertical direction to deposit boxes and packages in specified orientations on the pallet. Such machines require a relatively large footprint area to take into account the length of the robotic arms. The computer software required to drive such equipment tends to be complicated as one arm is utilized to perform all movements and make all adjustments.

A further difficulty with robot palletizers is that due to the rotating arm, slow movement occurs. This is because the angular momentum of the arm increases with rotational speed and this tends to put undue strain on the components.

A different prior art type is layer palletizers, in which whole layers of goods are shunted together, and then placed on a pallet, which then moves downward. Such an arrangement is limited in packing patterns, and relatively difficult to change between packing patterns and different goods. Additionally, a very large footprint area is required.

Gantry robot palletizers are also known in the prior art, with a gripper means which translates in three dimensions relative to a stationary pallet table. This arrangement is relatively slow, as for some pallet positions relatively large travel is necessary in three dimensions to load the pallet. It also requires the load to be carried at the end of a cantilever, increasing the wear and tear on the device.

A palletizer is described in U.S. Pat. No. 5087169 having a robotic arm which rotates around a pivot mounted upon a carriage, which carriage translates along a substantially H frame track system. The disadvantages of this system stem from the fact that such equipment occupies a large amount of space, and that despite some reduction in footprint, the computational and engineering problems of rotating objects at the end of arms remain. The rotating arms, which can also be articulated, require clear space within which to effectively operate.

The rotating arm produces high torsional loads on the sliding carriage as the load is carried away from the axis of rotation. The machinery to achieve this task is expensive and bulky. It is difficult to achieve a rigid but free moving linear axis when high torsional loads are exerted. Wherever circular movement paths are provided, wasted space results. Because of the rotational effects of the gripper means of prior art devices a rather substantial and extremely positive gripping mechanism needs to be utilized.

U.S. Pat. No. 5051058 discloses a palletizer which requires very complex pallet table movements and an extremely elaborate means to mount boxes onto the pallets. This invention relies on the movement of the pallet, and complex movements prior to being placed on the pallet.

It is an object of the present invention to provide a palletizing system which has a relatively small footprint, yet is capable of a good speed of operation in use.

SUMMARY OF INVENTION

According to one aspect the present invention provides a palletizing system for placing articles from a conveying means onto a pallet. The system includes: at least one first track, and a second track having a longitudinal axis. The at least one first track is adapted to move along the second track.

At least one gripper is adapted to engage at least one article to be palletized. The gripper is innerconnected with from a translatable carriage means on the at least first track.

An apparatus moves at least one pallet along a vertical axis.

A control responsive to a predetermined instruction set controls the movement of the at least one first track along the second track, each of the translatable carriages, the gripper and the moving apparatus, such that after one or more articles have been placed on one layer on a pallet on one of the moving members, the moving member moves downwardly to allow for articles to be placed on a next layer with minimal or no vertical movement of the gripper.

Preferably the member for moving at least one pallet moves downwardly to a new base level after a layer of articles has been completed on a pallet.

Preferably the gripper pan be rotated around a vertical axis. A conveyor bringing articles to the palletizing system may incorporate an article orientating device.

Preferably a third track parallel to the second track is utilized to support another end of the first track.

Optionally, the palletizing system incorporates two grippers each on a separately translatable carriage both of which are operatively linked to the first track. The carriages pan be rigidly linked or flexibly linked, or simply controlled so as to move in unison. Another arrangement wherein there are a plurality of first tracks each with one (or more) gripper is also contemplated within the present invention.

The present invention provides a palletizer which can operate faster known palletizers because the articles are driven directly along the axis of travel. Torsional loads exerted upon the track are decreased because the load or gripper is generally located near the longitudinal axis of the track which means that lighter more economical construction results. Further, reduced production costs tend to result because smaller sized motors and less materials are utilized because the construction which results tends to be lighter and freer.

Another advantage which results from the present invention is that it produces a very compact envelope or footprint occupied by the palletizer. A further advantage is that the ability of the pallet table to move vertically means that simpler controls and motive power connections can be utilized in the palletizer.

Because of the orientation of the tracks only very simple rotational movements need be made by the gripper. The gripper needs only to rotate through 90° to effectively load a pallet with boxes. Because no long arm is utilized centrifugal forces are low and thus vacuum grippers could be utilized because very small centrifugal forces might be encountered.

It will be appreciated that only a short, predictable vertical movement for pick up and/or unloading, or in some arrangements no vertical movement, is required of the gripper.

BRIEF DESCRIPTION OF DRAWINGS

An embodiment of the present invention will now be described with reference to the accompanying drawings in which:

FIG. 8 is a cross-sectional view taken along the line A—A in FIG. 2.

DETAILED DESCRIPTION OF THE PREFERRED EMBODIMENTS

Figure 1:
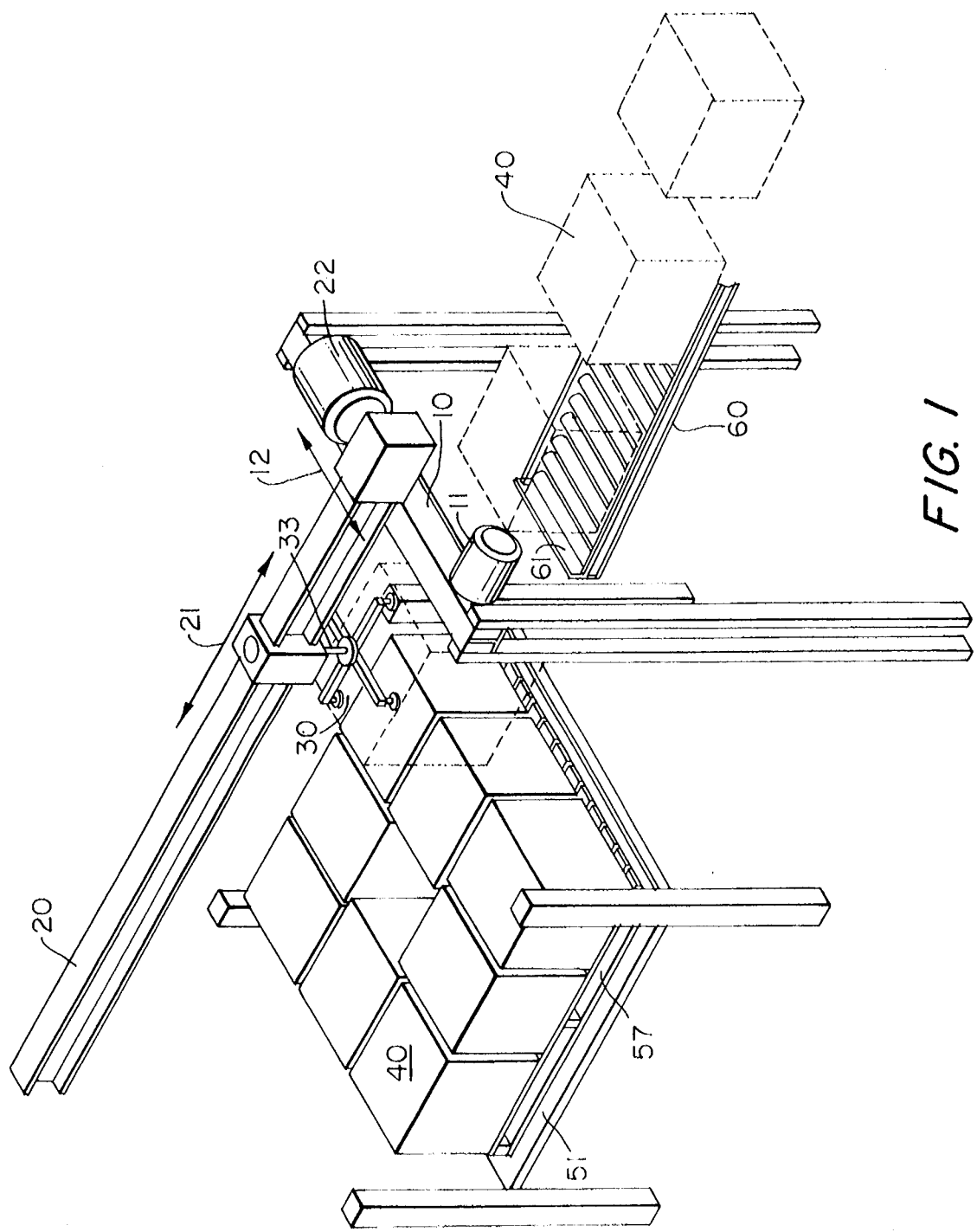
FIG. 1 is a perspective view of a cantilever track mechanism embodying the present invention.

Illustrated in FIG. 1 is a stationary track 10 which has a motor means 11 to translate track 20 in the direction of arrow 12. Perpendicular to arrow 12 is the direction of track 20 which carries gripper 30. The gripper 30 is moved in the direction of arrow 21 by means of motor 22. Preferably, motors 11 and 22 are electric and drive via a toothed belt type mechanism - however, any suitable drive arrangement may be used.

Also illustrated in FIG. 1 is a box 40 which has been engaged by gripper 30. The track 20 is cantilevered away from track 10.

In operation a conveyor 60 delivering boxes and articles to the palletizer delivers boxes adjacent to the palletizer. In this way a minimum of space is occupied. The palletizer moves the boxes 40 to a pallet which is located on a pallet lift table 51 which is able to lift and lower the pallet and boxes mounted thereon.

Gripper 30 illustrated is of a vacuum gripper type. However, it will be appreciated that any suitable gripping mechanism may be used within the present inventive concept.

Operation of the system is as follows. Boxes 40 to be palletized arrive on conveyor 60 and stop at end stop 61. Gripper 30 is translated along tracks 20 and 10 to a point above conveyor 60, the collect mechanism 33 lowered, and the vacuum arrangement activated so as to engage a box 40. Box 40 is then lifted by retracting collect mechanism 33, and the gripper translated to the appropriate x,y position for the box 40. As the pallet table 51 is also controlled, it is at the correct height already, and gripper 30 can be simply disengaged so as to drop box 40 a short distance into position on the pallet 57. This process is repeated until a layer is filled, at which time pallet table 51 moves down one box layer in height so that the next layer may be positioned. After all the layers are filled, pallet 57 is lowered to a height suitable for a fork truck or automatic means to remove the filled pallet 57 from the table, pallet 57 is removed, and a new pallet is loaded and raised to the appropriate height for the first layer to be loaded.

While FIG. 1 illustrates an embodiment of the invention which may be used, it is not preferred. The use of a cantilever arm arrangement is not ideal, as it causes heavy wear on the bearings, and gives rise to some reductions in efficiency due to the high inertial load if a box is carried at the far end of the cantilevered arm.

Figure 2:
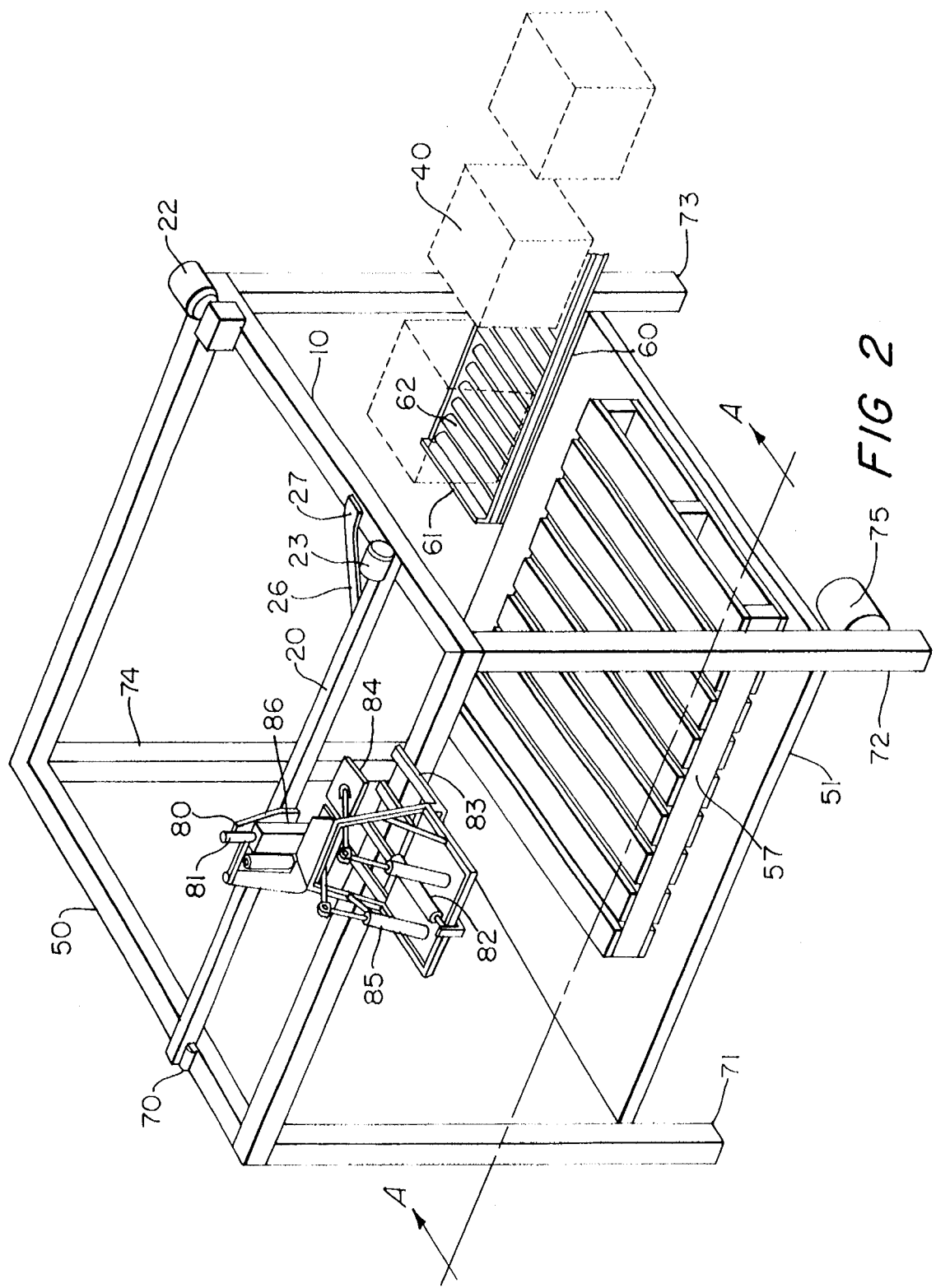
FIG. 2 is a perspective view of a H track mechanism embodying the present invention.
Figure 4:
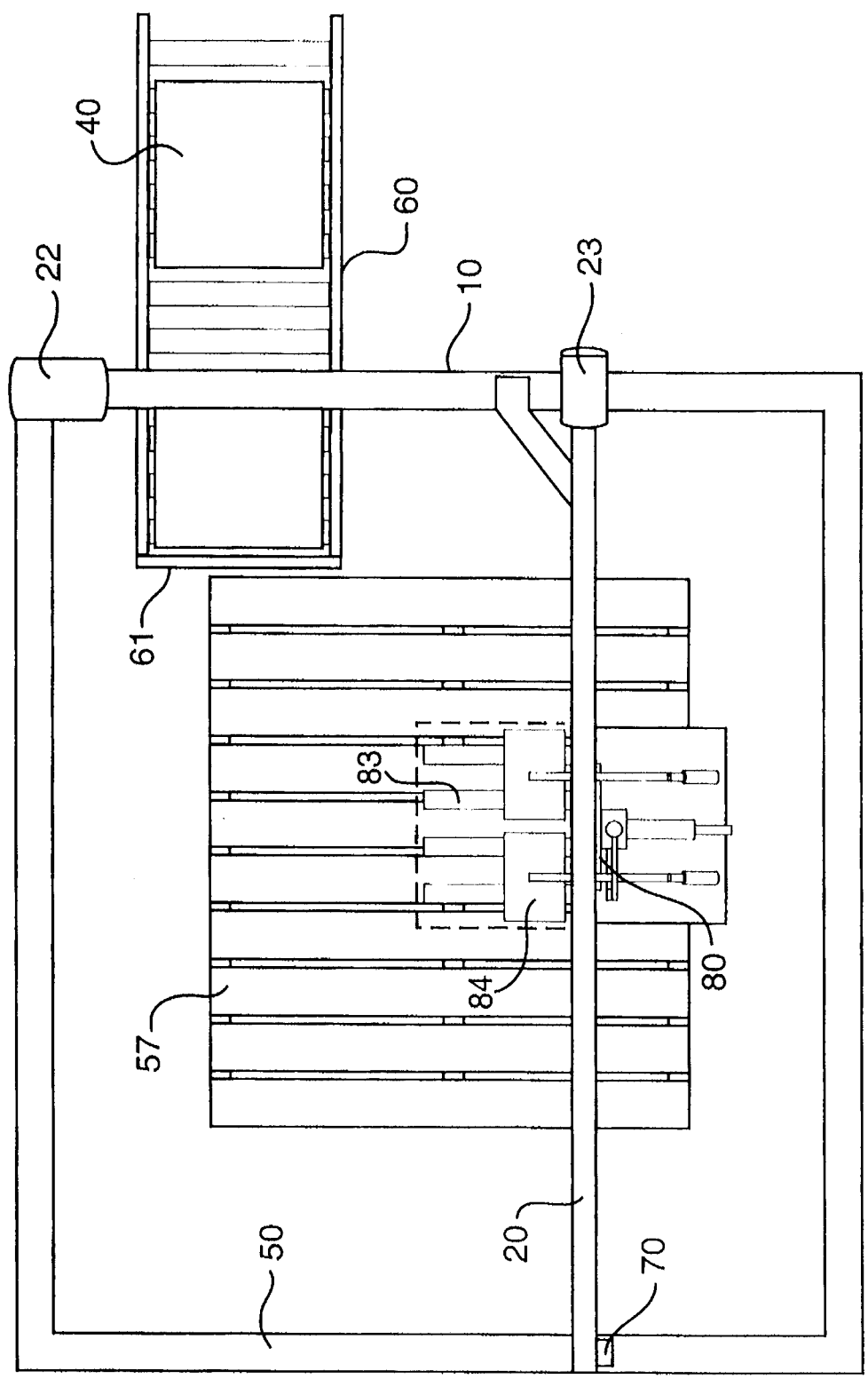
FIG. 4 is a plan view corresponding to FIG. 2.
Figure 5:
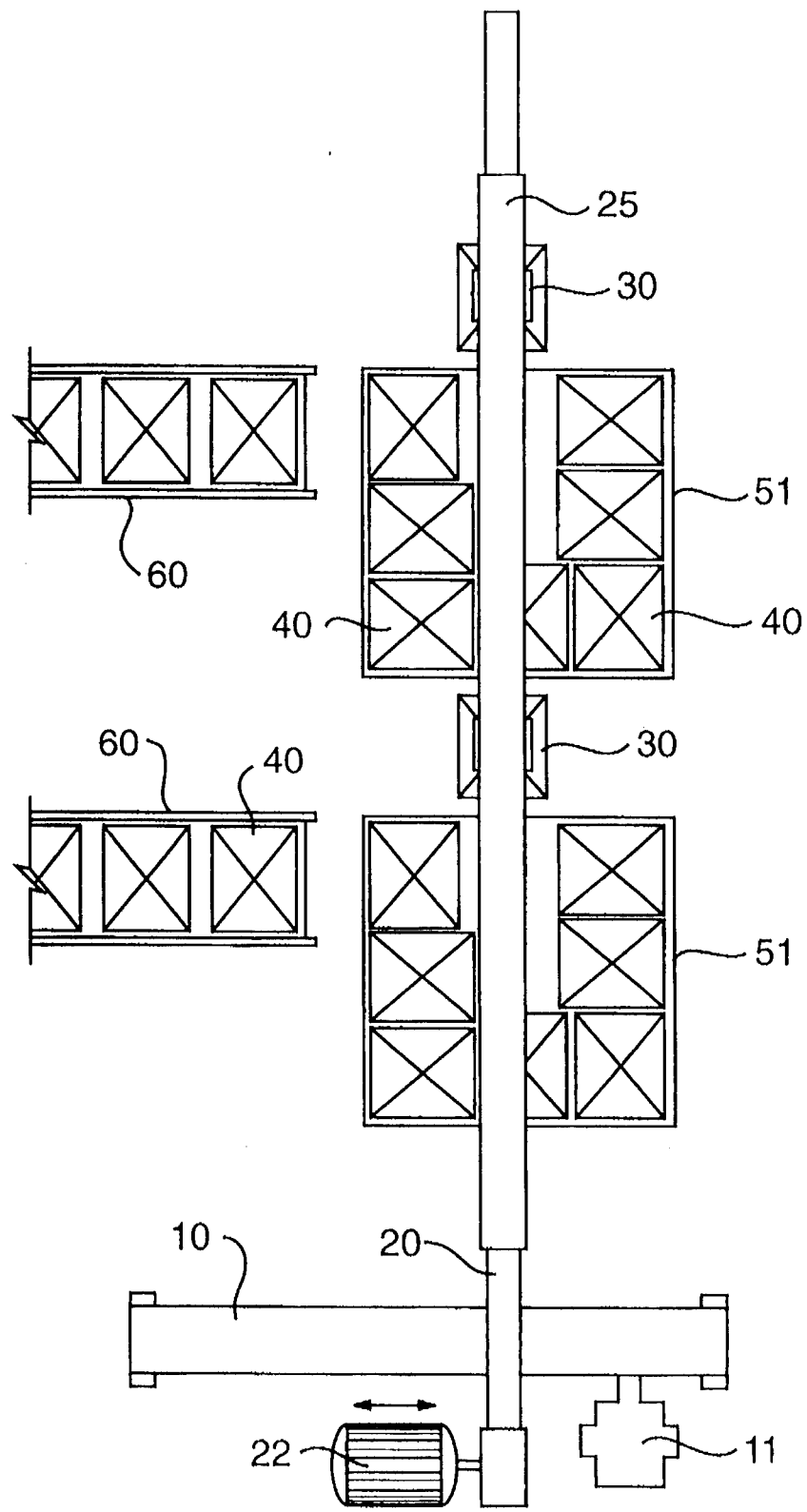
FIG. 5 is a plan view of a the embodiment shown in FIG. 3 including a cantilever track mechanism.
Figure 6:
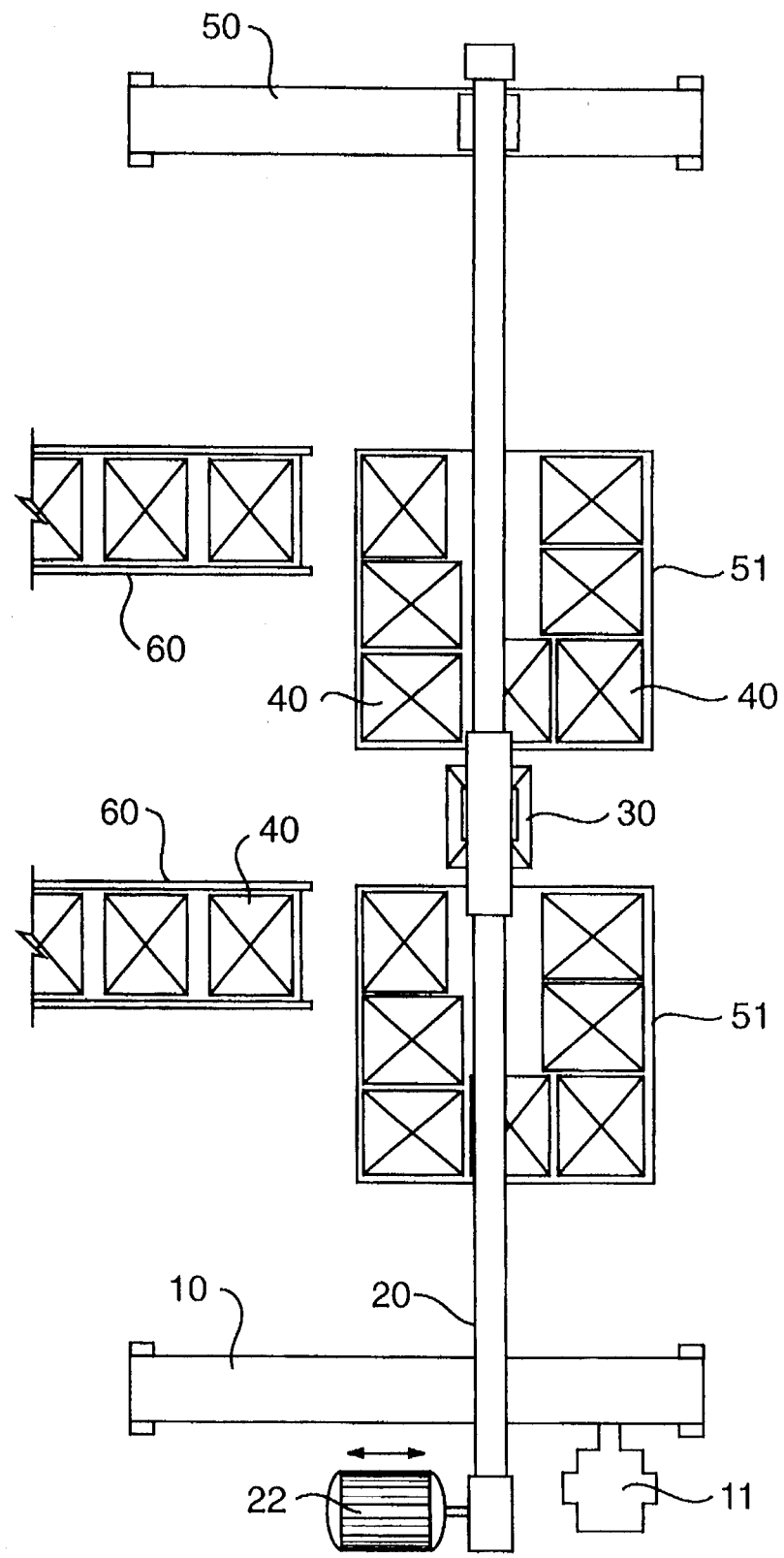
FIG. 6 is a plan view of an embodiment including one gripper meals and two pallets.
Figure 7:
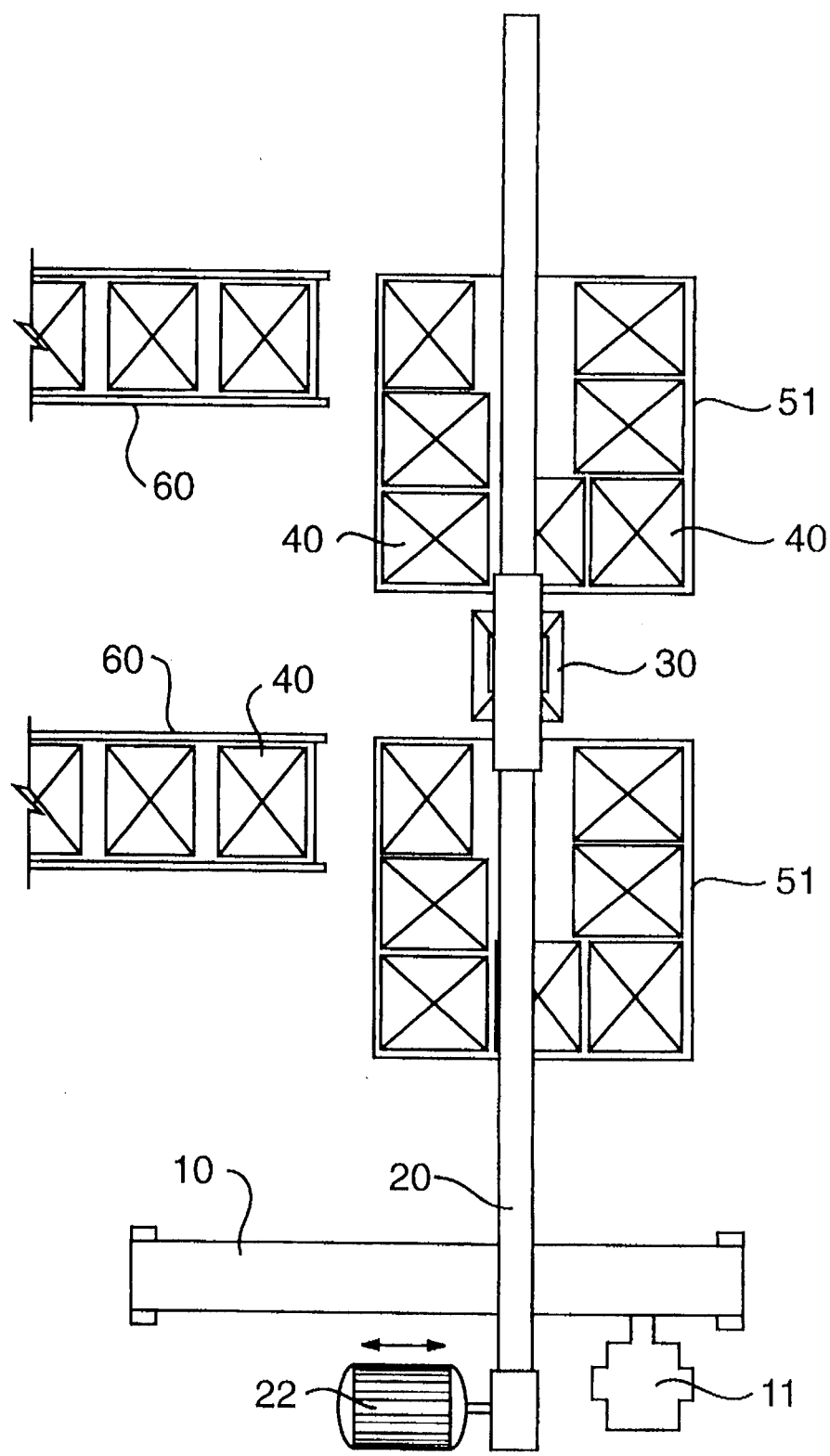
FIG. 7 is a plan view of the embodiment shown in FIG. 6, including a cantilever track mechanism.

FIG. 2 illustrates a preferred form of the present invention in perspective, while FIG. 4 shows a plan view. A third track 50 allows the transverse track 20 to straddle the pallet lift table 51 and conveyor 60. The conveyor 60 delivers goods adjacent to the pallet lift table 51 thereby decreasing the amount of travel hat the gripper 30 needs to make. As is indicated in FIG. 2 and similarly to FIG. 1 the box 40 when held by gripper 80 need only be rotated through 90° at most or no rotation need be made where the box will remain in the same orientation.

Gripper 80 utilizes a more positive clamp mechanism than shown in FIG. 1. Top clamps 84 and tines 83 grip a box between them. The device works pneumatically, with tines 83 retracting for loading by operating cylinder 82, and clamps 84 lifting upward by operation of cylinder 85. Collect mechanism 81 and rotator 86 are similarly pneumatic in operation. Preferably, rotator has a fixed 90° rotation. The collect mechanism provides a short travel, for instance 50 mm, to allow for a box to be collected. The rotator and collect mechanisms are connected to an overall pneumatic and electrical control system for the palletizer mechanism, so theft the gripper 80, pallet table 51 and movement of the gripper along track 20 and of the track 20 along track 10 are all under common control. Of course, any other suitable gripper may be substituted.

The rotation of articles may alternatively be achieved by including a rotating feed point for the palletizer, or by allowing rotation of the pallet table itself. The lifting or collecting movement could be alternatively performed by utilising a ram arrangement at the pick up point on the conveyor 60. These mechanisms are well known in the field. The gripper arrangement shown is, however, preferred.

Pallet table 51 is preferably operated by a chain drive system 52 via motor 75, the chains 53 being of conventional type and carried inside the support arms 72, 73, 74. T he support arms are preferably I-form steel beams, with cosmetic facings if desired. The chain drives being largely concealed is advantageous from a safety and reliability perspective, and minimizes again the space requirement. Preferably, the conveyor 60 is mounted directly onto the support 73 as shown. Preferably, the control box for the system is located in or attached to one of the support arms, and is itself remotely controlled via a PC system. Sensors of various types will also be required to ascertain or verify position, among other things, as will well be understood. These are preferably connected to the control box.

Track 50 is engaged by track 20 using a roller arrangement 70, as movement is controlled from motor/carriage unit 23. Preferably, roller 70 is free running, and the drive arrangement at motor/carriage unit 23 is pin jointed, so that in the event of operational faults causing the pallet table to lift too high, the gripper and track assembly simply lifts upwardly without damage. Motors 22, 23 preferably drive a toothed belt arrangement so as to drive the gripper 80 and track 20. Preferably, a bracing member 26 is joined to another carriage 27 on track 10, so as to provide stability against bending during movement of track 20. It will be appreciated that for clarity, details of motors, gearboxes and drive arrangements, cable connections, and control devices have not been provided or illustrated, as these are well known and may be purchased off the shelf from a wide variety of suppliers. Additionally, the preferred components will vary with applications, for example expected box sizes and loads and the facilities available on the installation site.

Operation of the system is as follows. Boxes 40 to be palletized arrive on conveyor 60 and stop at end stop 61. Gripper 80 is translated along track 20, and along the axis of track 10 by movement of track 20, to a point adjacent conveyor 60, the collect mechanism 81 lowered, and the gripper 80 moved inwardly so that tines 84 interlay rollers 62. The gripper is then closed, so that clamp 84 engages a box 40. Box 40 is then lifted by retracting collect mechanism 81, and the gripper translated to the appropriate x,y position for the box 40 to be placed on pallet 57. The box 40 may be rotated via mechanism 86 if necessary. As the pallet table 51 is also controlled, it is at or moved to the correct height, and gripper 80 can be simply disengaged so as to drop box 40 a short distance into position on the pallet 57. This process is repeated until a layer is filled, at which time pallet table 51 moves down one box layer in height so that the next layer may be positioned. After all the layers are filled, pallet 57 is lowered to a height suitable for a fork truck or automatic means to remove the filled pallet from the table, pallet 57 is removed, and a new pallet is loaded and raised to the appropriate height for the first layer to be loaded.

The overall preferred arrangement of the embodiment of FIG. 2 can be better seen from FIG. 4. It should be noted that depending upon the gripper arrangement used, a working space may need to be provided within the palletizer to permit operation of the mechanism, and this may provide some limits to available working space within the palletizer.

Because of light weight construction, the sizes of the motors utilized to produce these movements such as rotation can be very simple and further the associated electronics and data processing required for a system embodying the present invention is much simpler due to a lesser degree of complexity in the movements. The construction of FIG. 2 allows for only one moving motor to be used.

Figure 3:
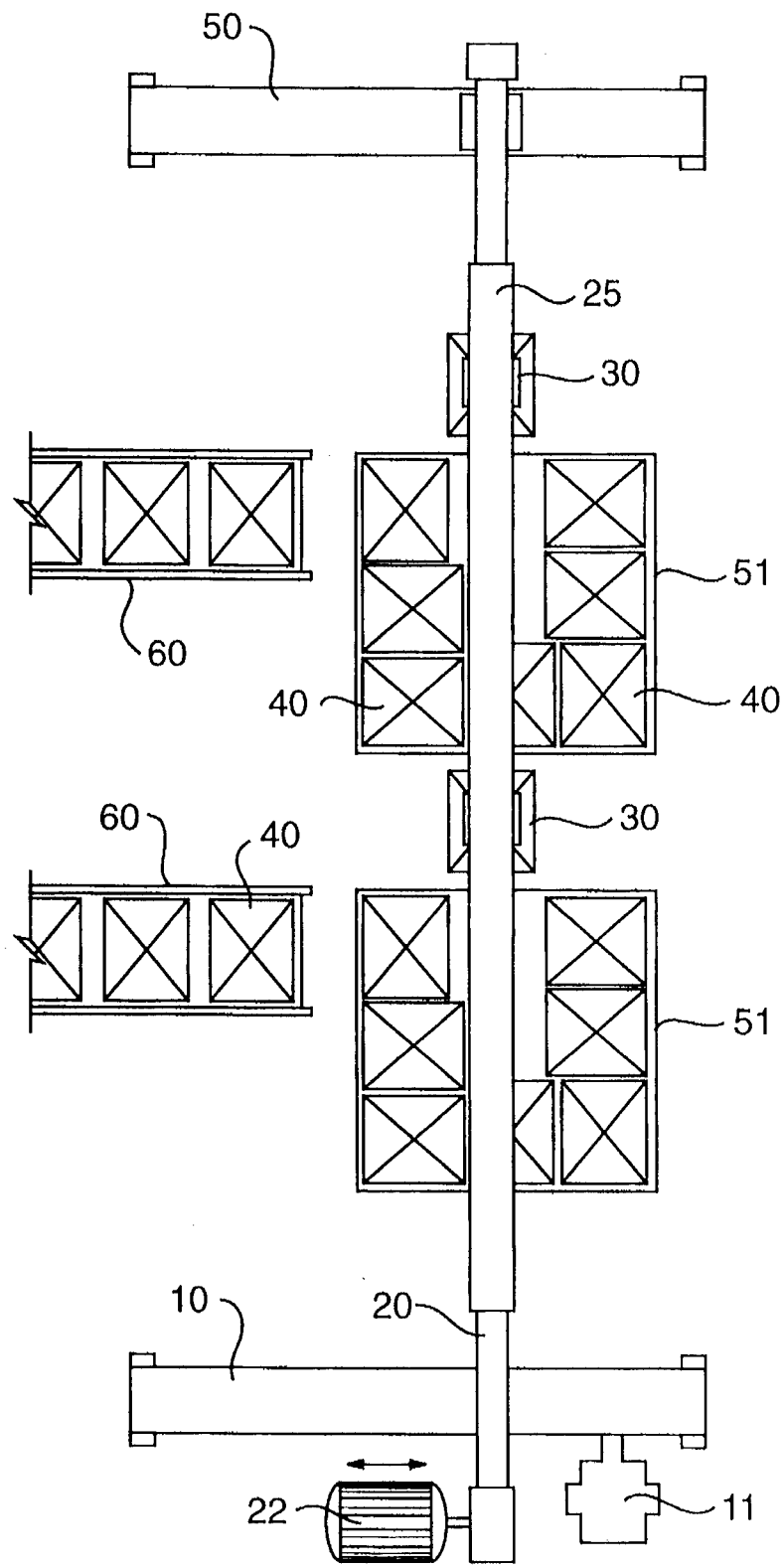
FIG. 3 is a plan view of a H track mechanism which includes a further embodiment of the present invention.

As illustrated in FIG. 3, a third embodiment of the present invention is similar to that of FIG. 2, except that a second gripper 30 is located on an elongated transverse track 20. Carriage 25 is somewhat bigger than the previous carriage and the elongated carriage 25 has mounted to it both grippers 30. With this embodiment the conveyor system 60 has a bifurcated terminus thus delivering two boxes to its furthest most point for simultaneous pick up by each of the grippers.

The twin or multiple gripper arrangement, which is relatively simple in implementation according to the configuration of the present invention, may be very advantageous in certain applications. Similarly, one or more extra transverse tracks parallel to track 20 could be used, if desired. Due to the relatively simple movements of the present invention, the inclusion of such facilities with a simple installation may be readily achieved. Maximum benefit is likely to be gained from this type of arrangement if the grippers and carriages are arranged or controlled so as to move in unison performing the same task in parallel, although there is no reason why they could not be separately controlled.

The present invention also lends itself to multiple bay applications, as many palletizers could be controlled by a central PC, and the design contains the necessary mechanism is within the support framework. Thus, multiple palletizers could be arranged back to back.

The foregoing describes one embodiment of the present invention and modifications by those skilled in the art can be made thereto without departing from the scope of this invention. For example the present invention can function as a de-palletizer as well as a palletizer.

I claim:

1. A palletizing system for placing articles from conveying means onto two pallets, said palletizing system comprising:

(a) first and second substantially horizontally extending tracks each having a longitudinal axis, said first track adapted to move along said second track;

(b) at least two gripper means, each of said at least two gripper means for engaging at least one article to be palletized, said gripper means utilizing minimal or no vertical movement to palletize the at least one article at substantially a same horizontal level as the at least one article is at when said at least two gripper means engage it;

(c) a translatable carriage for supporting said at least two gripper means, said translatable carriage being movably mounted on said first track;

(d) two pallet support means each for supporting a respective pallet, each of said pallet support means moving along a vertical axis; and (e) control means for controlling the movement of said first track, said translatable carriage, said at least two gripper means and said two pallet support means, said control means being responsive to a predetermined instruction set such that after each of said at least two gripper means places the at least one article in a layer on a respective one of said pallets, each of said pallets moves downwardly to permit each of said at least two gripper means to place another of said at least one article in a next layer on said respective pallet also with minimal or no vertical movement of said at least two gripper means.

2. A palletizing system according to claim 1, wherein said control means moves each of said pallet supports downwardly to a new base level after a layer of articles has been completed on the respective pallet.

3. A palletizing system according to claim 1 or 2, further comprising a rotator for rotating each of said at least two gripper means about a vertical axis.

4. A palletizing system according to claim 1 or 2, wherein said conveyor includes a plurality of rollers, and wherein each of said at least two gripper means includes at least one tine for engaging a lower side of an article, such that said at least one tine may interlay with said rollers to engage an article.

5. A palletizing system according to claim 1, wherein said first track is cantilevered with respect to said second track.

6. A palletizing system according to claim 1, further comprising a third track parallel to said second track, wherein said second and third tracks support said first track.

7. A palletizing system according to claim 6, further comprising vertical support members for supporting said second and third tracks, and wherein each of said pallet supports comprises a drive mechanism interconnected with said vertical support members.

8. A palletizing system according to claim 1, wherein said first track is movable relative to said second track from only one end of said first track.

9. A palletizing system for sequentially placing articles from at least one conveyor onto any one of two or more pallets, said system comprising:

(a) first and second substantially horizontally extending tracks each having a longitudinal axis, said first track being movable along said second track;

(b) separate pallet supports for each pallet, each pallet support independently movable along a respective vertical axis and each supporting a pallet;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto any one of the pallets carried by any of said pallet supports; and (e) control means for controlling the movement of said first track, said translatable carriage, said gripper and each of said at least two pallet supports, said control means being responsive to a predetermined instruction set, such that after said gripper places the at least one article in a layer on one of said pallets supported by a respective one of said pallet supports, said respective pallet support moves downwardly to permit said gripper to place another of said at least one article in a next layer on said pallet also with minimal or no vertical movement of said gripper.

10. A palletizing system according to claim 9, wherein said control means moves each of said pallet supports downwardly to a new base level after a layer of articles has been completed on the respective supported pallet.

11. A palletizing system according to claim 9 or claim 10, further comprising a rotator for rotating the gripper about a vertical axis.

12. A palletizing system according to claim 10, wherein said first track is cantilevered with respect to said second track.

13. A palletizing system according to claim 9, further comprising a third track parallel to said second track, wherein said first track is supported by said second and third tracks.

14. A palletizing system according to claim 13, further comprising vertical support members for supporting said second and third tracks, and wherein each of said pallet supports comprises a drive mechanism interconnected with said vertical support members.

15. A palletizing system according to claim 9 or 10, wherein said at least one conveyor includes a plurality of rollers, and wherein said gripper includes at least one tine for engaging a lower side of an article to be palletized, such that said at least one tine may interlay with said rollers to engage said at least one article to be palletized.

16. A palletizing system according to claim 9, wherein said first track is driven relative to said second track from only one end of said first track.

17. A palletizing system for placing articles from at least one conveyor onto at least two pallets, said system comprising:

(a) first and second substantially horizontally extending tracks each having a longitudinal axis, said first track being cantilevered with respect to said second track and being movable along said second track;

(b) at least two pallet supports each movable along a vertical axis and each supporting a pallet;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto any one of the at least two pallets carried by any of said at least two pallet supports; and (e) control means for controlling the movement of said first track, said translatable carriage, said gripper and each of said at least two pallet supports, said control means being responsive to a predetermined instruction set, such that after said gripper places the at least one article in a layer on one of said at least two pallets supported by a respective one of said at least two pallet supports, said respective one of the at least two pallet supports moves downwardly to permit said gripper to place another of said at least one article in a next layer on said respective one of the at least two pallets also with minimal or no vertical movement of said gripper.

18. A palletizing system for placing articles from at least one conveyor onto at least two pallets, said system comprising:

(a) first and second substantially horizontally extending tracks each having a longitudinal axis, said first track being movable along said second track;

(b) at least two pallet supports each movable along a vertical axis and each supporting one of the at least two pallets;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto one of the at least two pallets carried by any of said at least two pallet supports;

(e) control means for controlling the movement of said first track, said translatable carriage, said gripper and each of said at least two pallet supports, said control means being responsive to a predetermined instruction set, such that after said gripper places the at least one article in a layer on one of said at least two pallets supported by a respective one of said at least two pallet supports, said respective one of said at least two pallet supports moves downwardly to permit said gripper to place another of said at least one article in a next layer on said respective one of the at least two pallets also with minimal or no vertical movement of said gripper; and (f) a rotator for rotating the gripper about a vertical axis.

19. A palletizing system for placing articles from at least one conveyor onto at least two pallets, said system comprising:

(a) first and second substantially horizontally extending tracks each having a longitudinal axis, said first track being movable along said second track;

(b) at least two pallet supports each movable along a vertical axis and each supporting one of the at least two pallets;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto one of the at least two pallets carried by any of said at least two pallet supports; and (e) control means for controlling the movement of said first track, said translatable carriage, said gripper and each of said at least two pallet supports, said control means being responsive to a predetermined instruction set, such that after said gripper places the at least one article in a layer on said one of said at least two pallets supported by a respective one of said at least two pallet supports, said respective one of said at least two pallet supports moves downwardly to permit said gripper to place another of said at least one article in a next layer on said respective one of the at least two pallets also with minimal or no vertical movement of said gripper, wherein said control means moves each of said at least two pallet supports downwardly to a new base level after a layer of articles has been completed on the respective supported pallet;

wherein said first track is cantilevered with respect to said second track.

20. A palletizing system for placing articles from at least one conveyor onto at least two pallets, said system comprising:

(a) first and second substantially horizontally extending tracks each having a longitudinal axis, said first track being movable along said second track;

(b) at least two pallet supports each movable along a vertical axis and each supporting one of the at least two pallets;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto one of the at least two pallets carried by any of said at least two pallet supports;

(e) control means for controlling the movement of said first track, said translatable carriage, said gripper and each of said at least two pallet supports, said control means being responsive to a predetermined instruction set, such that after said gripper places the at least one article in a layer on said one of said at least two pallets supported by a respective one of said at least two pallet supports, said respective one of said at least two pallet supports moves downwardly to permit said gripper to place another of said at least one article in a next layer on said respective one of the at least two pallets also with minimal or no vertical movement of said gripper;

(f) a third track parallel to said second track; and (g) vertical support members for supporting said second and third tracks;

wherein each of said at least two pallet supports comprises a drive mechanism interconnected with said vertical support members, and wherein said first track is supported by said second and third tracks.

21. A palletizing system for placing articles from at least one conveyor onto at least two pallets, said system comprising:

(a) first and second substantially horizontally extending tracks each having a longitudinal axis, said first track being movable along said second track;

(b) at least two pallet supports each movable along a vertical axis and each supporting one of the at least two pallets;

(c) a gripper for engaging at least one article to be palletized, said gripper utilizing minimal or no vertical movement to palletize the at least one article at substantially a same horizontal level as the at least one article is at when said gripper engages it;

(d) a translatable carriage for supporting said gripper, said translatable carriage being movably mounted on said first track, both said first track and said carriage being movable to enable said gripper to deposit said at least one article onto one of the at least two pallets carried by any of said at least two pallet supports; and (e) control means for controlling the movement of said first track, said translatable carriage, said gripper and each of said at least two pallet supports, said control means being responsive to a predetermined instruction set, such that after said gripper places the at least one article in a layer on said one of said at least two pallets supported by a respective one of said at least two pallet supports, said respective one of said at least two pallet supports moves downwardly to permit said gripper to place another of said at least one article in a next layer on said respective one of the at least two pallets also with minimal or no vertical movement of said gripper;

wherein said at least one conveyor includes a plurality of rollers, and wherein said gripper includes at least one tine for engaging a lower side of said at least one article to be palletized, such that said at least one tine may interlay with said plurality of rollers to engage said at least one article to be palletized.

22. A palletizing system for placing articles from conveying means onto two pallets, said palletizing system comprising:

(a) first and second substantially horizontally extending tracks each having a longitudinal axis, said first track being cantilevered with respect to said second track and being adapted to move along said second track;

(b) at least two gripper means, each of said at least two gripper means for engaging at least one article to be palletized;

(c) a translatable carriage for supporting said at least two gripper means, said translatable carriage being movably mounted on said first track;

(d) two pallet support means each for supporting a respective pallet of said pallets, each of said pallet support means moving along a vertical axis; and (e) control means for controlling the movement of said first track, said translatable carriage, said at least two gripper means and each of said two pallet support means, said control means being responsive to a predetermined instruction set such that after each of said at least two gripper means places the at least one article in a layer on said respective one of said pallets, each of said pallet support means moves downwardly to permit each of said at least two gripper means to place another of said at least one article in a next layer on said respective pallet also with minimal or no vertical movement of said at least two gripper means.

23. A palletizing system for placing articles from conveying means onto two pallets, said palletizing system comprising:

(a) first and second substantially horizontally extending tracks each having a longitudinal axis, said first track adapted to move along said second track;

(b) a third track parallel to said second track, wherein said second and third tracks support said first track;

(c) vertical support members for supporting said second and third tracks;

(d) at least two gripper means, each of said at least two gripper means for engaging at least one article to be palletized;

(e) a translatable carriage for supporting said at least two gripper means, said translatable carriage being movably mounted on said first track;

(f) two pallet support means each for supporting a respective pallet of said pallets, each of said pallet support means moving along a vertical axis, and wherein each of said pallet support means comprises a drive mechanism interconnected with said vertical support members; and (g) control means for controlling the movement of said first track, said translatable carriage, said at least two gripper means and each of said two pallet support means, said control means being responsive to a predetermined instruction set such that after each of said at least two gripper means places the at least one article in a layer on said respective one of said pallets, each of said pallet support means moves downwardly to permit each of said at least two gripper means to place another of said at least one article in a next layer on said respective pallet also with minimal or no vertical movement of said at least two gripper means.

* * * * *